United States Patent
Narayanan et al.

(10) Patent No.: US 11,209,980 B2
(45) Date of Patent: Dec. 28, 2021

(54) STORING DIFFERENCE BETWEEN CURRENT DATA VERSION AND ONE OF MULTIPLE DATA VERSIONS IN A DISPERSED STORAGE NETWORK MEMORY

(71) Applicant: INTERNATIONAL BUSINESS MACHINES CORPORATION, Armonk, NY (US)

(72) Inventors: Ram Narayanan, Chicago, IL (US); Ethan Wozniak, Cook, IL (US); Jason Resch, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 30 days.

(21) Appl. No.: 16/587,951

(22) Filed: Sep. 30, 2019

(65) Prior Publication Data
US 2021/0096746 A1 Apr. 1, 2021

(51) Int. Cl.
*G06F 3/06* (2006.01)

(52) U.S. Cl.
CPC ............ *G06F 3/0604* (2013.01); *G06F 3/064* (2013.01); *G06F 3/067* (2013.01); *G06F 3/0608* (2013.01)

(58) Field of Classification Search
CPC .................................................... G06F 3/064
See application file for complete search history.

(56) References Cited

U.S. PATENT DOCUMENTS

| | | | |
|---|---|---|---|
| 7,831,735 B1 * | 11/2010 | Kabra | G06F 16/1865 709/248 |
| 8,943,279 B1 | 1/2015 | McHugh et al. | |
| 9,842,027 B1 * | 12/2017 | Chopra | G06F 11/1458 |
| 10,114,831 B2 | 10/2018 | VanderSpek et al. | |
| 10,178,083 B2 | 1/2019 | Resch et al. | |
| 10,216,774 B2 | 2/2019 | Dang et al. | |
| 10,275,313 B2 | 4/2019 | Shirley, Jr. et al. | |
| 10,289,400 B2 | 5/2019 | De Zaeytijd et al. | |
| 2003/0093440 A1 * | 5/2003 | Merrells | H04L 69/329 |

(Continued)

OTHER PUBLICATIONS

Chen et al., "Giza: Erasure Coding Objects Across Global Data Centers", USENIX ATC'17 USENIX Annual Technical Conference on, pp. 539-551, Jul. 12-14, 2017, 14 pages.

(Continued)

*Primary Examiner* — Chie Yew
(74) *Attorney, Agent, or Firm* — Anthony England; Andrew D. Wright; Roberts Calderon Safran & Cole, P.C.

(57) ABSTRACT

Methods and systems for storing multiple data versions in a dispersed storage network memory are disclosed. A method includes: receiving, by a computing device, a request to store a current version of a data object in a dispersed storage network (DSN) memory; retrieving, by the computing device, a plurality of other versions of the data object from the DSN memory; for each of the plurality of other versions of the data object, the computing device determining a difference between the current version of the data object and the other version of the data object; and storing, by the computing device, in the DSN memory, the difference between the current version of the data object and a first other version of the data object selected from the plurality of other versions of the data object.

13 Claims, 8 Drawing Sheets

(56) References Cited

U.S. PATENT DOCUMENTS

| | | | | |
|---|---|---|---|---|
| 2007/0294684 | A1* | 12/2007 | Kumashiro | G06F 8/65 717/168 |
| 2011/0029731 | A1* | 2/2011 | Cilfone | G06F 3/0607 711/114 |
| 2011/0289052 | A1* | 11/2011 | Rambacher | G06F 16/1873 707/624 |
| 2012/0143999 | A1* | 6/2012 | George | H04L 67/2842 709/219 |
| 2014/0133499 | A1* | 5/2014 | Harriman | G06F 11/0745 370/475 |
| 2014/0237462 | A1* | 8/2014 | Zheng | G06F 8/62 717/170 |
| 2015/0370645 | A1* | 12/2015 | Dhanalakoti | G06F 11/1461 707/646 |
| 2016/0098431 | A1 | 4/2016 | Ebsen et al. | |
| 2018/0024746 | A1 | 1/2018 | Jagadeesh et al. | |
| 2018/0145983 | A1 | 5/2018 | Bestler | |
| 2018/0165083 | A1 | 6/2018 | Leach et al. | |
| 2018/0205791 | A1 | 7/2018 | Frank et al. | |
| 2019/0095475 | A1 | 3/2019 | Shattah et al. | |

OTHER PUBLICATIONS

Harshan et al., "Sparsity Exploiting Erasure Coding for Resilient Storage and Efficient I/O Access in Delta based Delta Based Versioning Systems", Cornell University Library, arXiv:1411.4762, pp. 1-10, Nov. 18, 2014, 10 pages.

Wang et al., "Multi-Version Coding in Distributed Storage", IEEE International Conference on Information Theory, pp. 871-875, Jun. 29-Jul. 4, 2014, 5 pages.

Malkhi et al.; "P2P Replica Synchronization With Vector Sets", ACM SIGOPS Operating Systems, Microsoft Research, vol. 41, Issue 2, pp. 68-74, Apr. 2007, 7 pages.

Mell et al., "The NIST Definition of Cloud Computing", NIST, Special Publication 800-145, Sep. 2011, 7 pages.

* cited by examiner

STORING DIFFERENCE BETWEEN CURRENT DATA VERSION AND ONE OF MULTIPLE DATA VERSIONS IN A DISPERSED STORAGE NETWORK MEMORY

BACKGROUND

Aspects of the present invention generally relate to computing devices and, more particularly, to methods and systems for storing multiple data versions in a dispersed storage network memory.

Computing devices communicate data, process data, and/or store data. Such computing devices range from wireless smart phones, laptops, tablets, personal computers (PCs), work stations, and video game devices, to data centers that support millions of web searches, stock trades, or online purchases every day. A computer may effectively extend its central processing unit (CPU) by using cloud computing to perform one or more computing functions (e.g., a service, an application, an algorithm, an arithmetic logic function, etc.) on behalf of the computer. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

Further, for large services, applications, and/or functions, cloud computing may be performed by multiple cloud computing resources in a distributed manner to improve the response time for completion of the service, application, and/or function. For example, Hadoop® (a registered trademark of The Apache Software Foundation) is an open source software framework that supports distributed applications enabling application execution by thousands of computers. Network storage is a computing capability that is typically offered by cloud computing providers. In particular, a user of cloud computing services may store and retrieve data on cloud infrastructure maintained by a cloud computing provider, such as a dispersed storage network (DSN) memory. A computer may use cloud storage as part of its memory system. Cloud storage enables a user, via a computer, to store files, applications, etc., on an Internet storage system. The Internet storage system may include a redundant array of independent disks (RAID) system and/or a dispersed storage system (dispersed storage network memory) that uses an error correction scheme to encode data for storage.

SUMMARY

In a first aspect of the invention, there is a method that includes: receiving, by a computing device, a request to store a current version of a data object in a dispersed storage network (DSN) memory; retrieving, by the computing device, a plurality of other versions of the data object from the DSN memory; for each of the plurality of other versions of the data object, the computing device determining a difference between the current version of the data object and the other version of the data object; and storing, by the computing device, in the DSN memory, the difference between the current version of the data object and a first other version of the data object selected from the plurality of other versions of the data object.

In another aspect of the invention, there is a computer program product that includes a computer readable storage medium having program instructions embodied therewith. The program instructions are executable by a computing device to cause the computing device to: receive a request to read a requested version of a data object in a dispersed storage network (DSN) memory; determine a dependency chain for the requested version of the data object; retrieve a base version of the data object, differences for each of a plurality of versions of the data object in the dependency chain, and differences for the requested version of the data object; combine the base version of the data object, the differences for each of the plurality of version of the data object in the dependency chain, and the differences for the requested version of the data object to obtain the requested version of the data object; and provide the requested version of the data object as a response to the request to read the requested version of the data object.

In another aspect of the invention, there is a system that includes: a hardware processor, a computer readable memory, and a computer readable storage medium associated with a computing device, wherein the computing device is a dispersed storage (DS) storage unit; program instructions to receive a request to store a slice of a current version of a data object; program instructions to determine a nearest previous version of the slice by comparing the slice of the current version of the data object to a plurality of previous versions of the slice; program instructions to determine a difference between the slice of the current version of the data object and the nearest previous version of the slice; and program instructions to store the difference in the DS storage unit, wherein the program instructions are stored on the computer readable storage medium for execution by the hardware processor via the computer readable memory.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
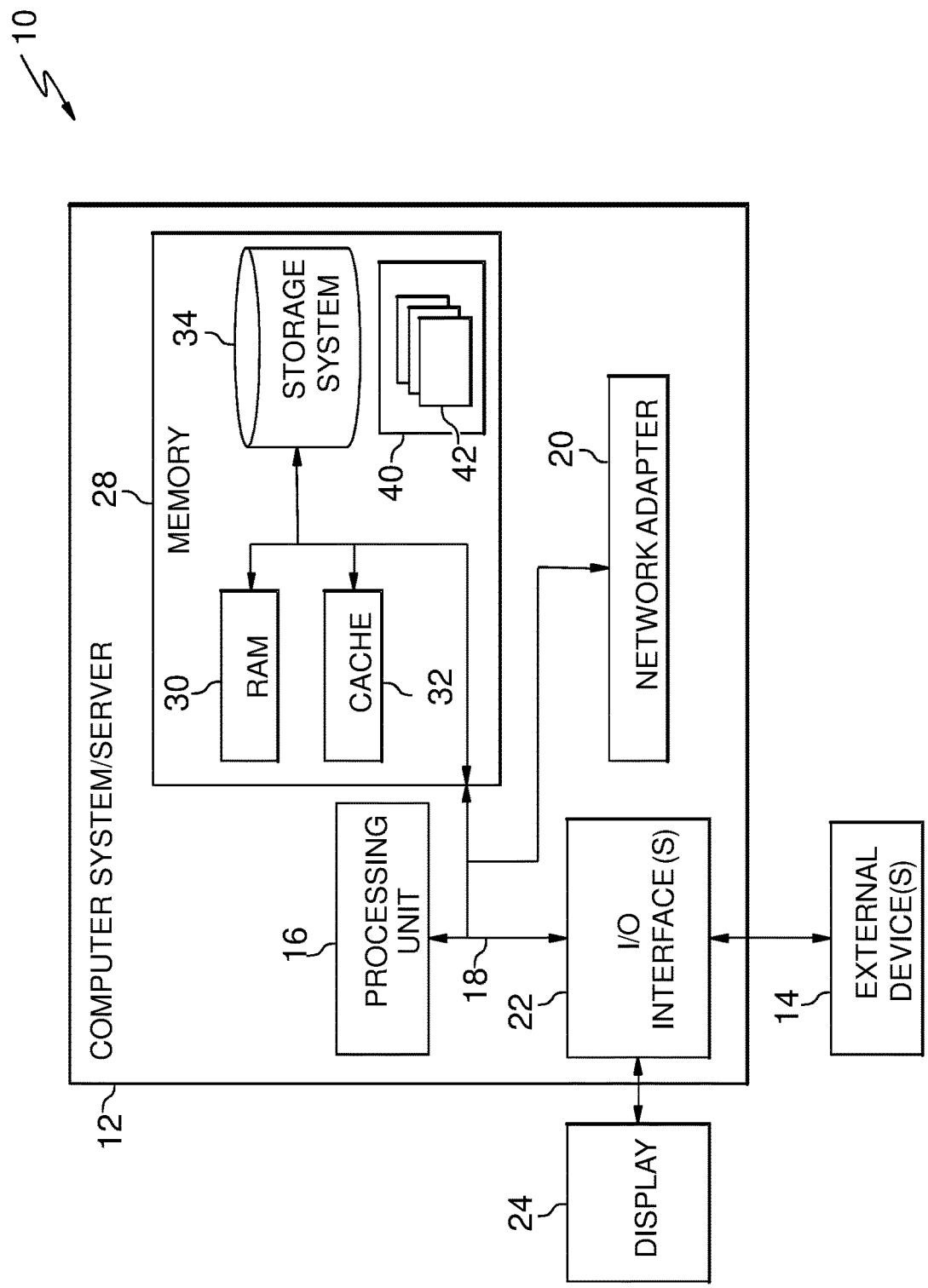
FIG. 1 depicts a cloud computing node according to an embodiment of the present invention.

Aspects of the present invention generally relate to computing devices and, more particularly, to methods and systems for storing multiple data versions in a dispersed storage network (DSN) memory. As described herein, aspects of the invention include a method and system that reduce the amount of storage used to store multiple versions of a data object in a DSN memory by storing only the difference of each version of the data object from previous versions of the data object. Aspects of the invention also reduce the amount of data read when reading all versions of the data object stored in the DSN by reading a single complete version of the data object and the difference of each version of the data object from previous versions of the data object. Aspects of the invention also include determining the differences that are stored in the DSN memory by a dispersed storage (DS) processing unit using the data object. Aspects of the invention also include determining the differences that are stored in the DSN memory by DS storage units using slices of the data object.

A DSN memory may write new versions of a data object or read existing versions of a data object. In embodiments, a DSN memory reduces the amount storage used and the amount of data read when reading all versions of a data object by storing the only the difference of each version of data from its previous version(s). If subsequent versions of a data object have only minor changes, this may immensely reduce storage requirements for the data object. Additionally, as the differences in versions of a data object are smaller in size compared to the data object as a whole, this also reduces the amount of data being processed when reading all versions of a data object.

Embodiments address problems with the amount of storage required for multiple versions of a data object in a DSN memory. Embodiments also address problems with the amount of data that is processed when reading all versions of a data object from a DSN memory. Accordingly, embodiments improve the functioning of a computer by providing methods and systems for storing multiple data versions in a DSN memory. In particular, embodiments improve the functioning of a computer by providing a method and system for reducing the amount of storage used to store multiple versions of a data object in a DSN memory by storing only the difference of each version of the data object from previous versions of the data object. Embodiments also improve the functioning of a computer by providing a method and system for reducing the amount of data read when reading all versions of the data object stored in the DSN by reading a single complete version of the data object and the difference of each version of the data object from previous versions of the data object. Additionally, implementations of the invention use techniques that are, by definition, rooted in computer technology (e.g., cloud computing and DSN memories).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
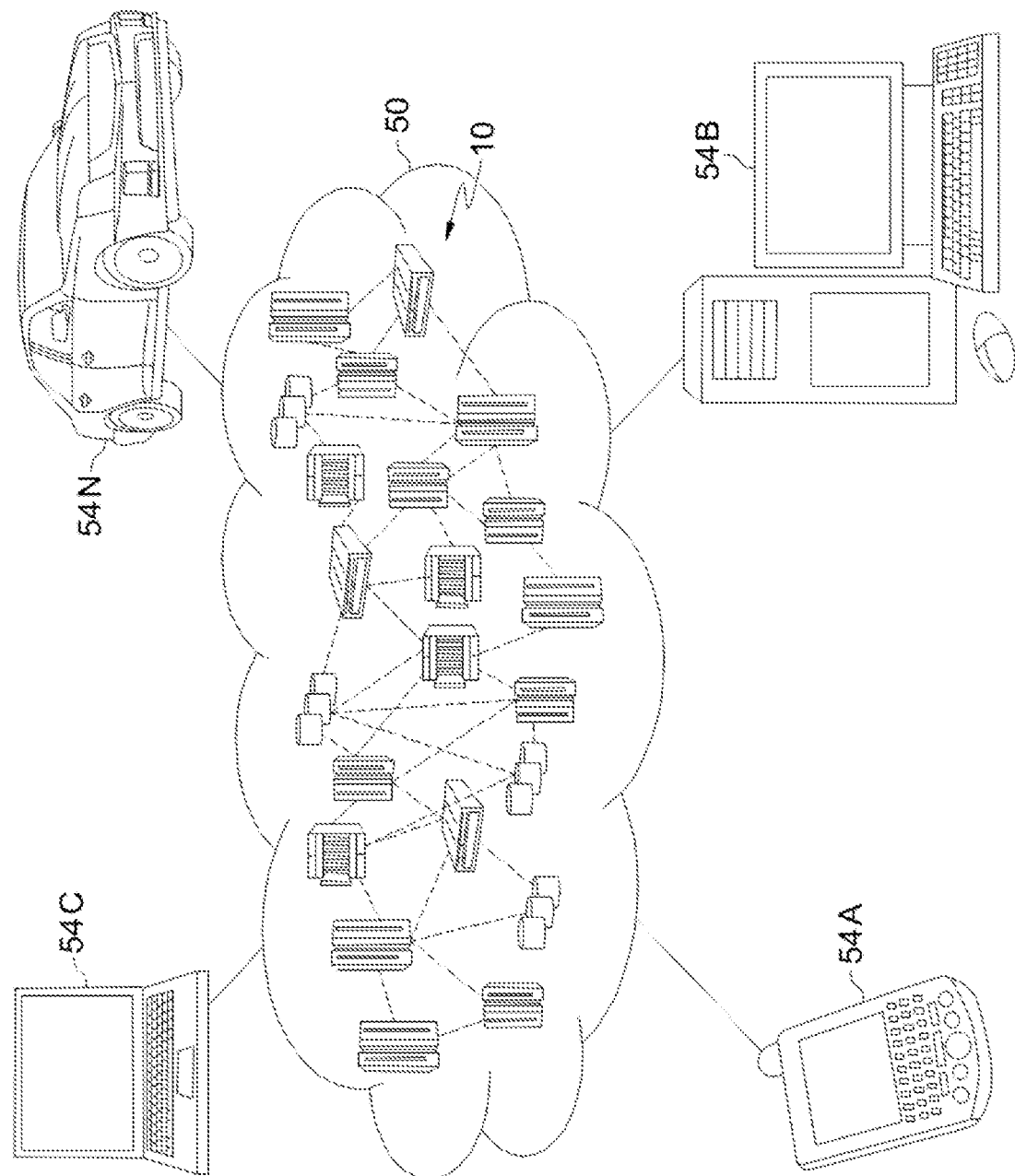
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
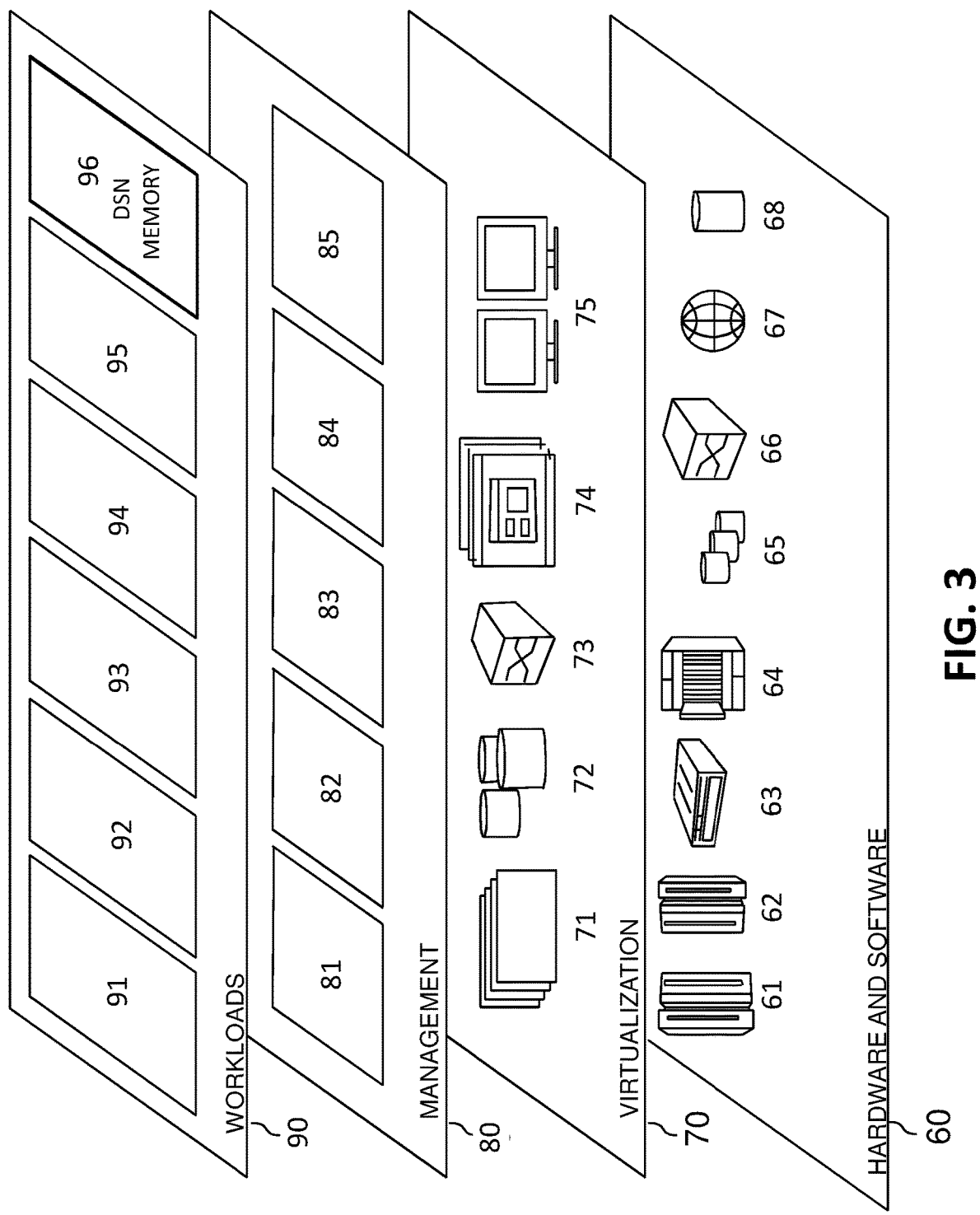
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and DSN memory 96.

Referring back to FIG. 1, the program/utility 40 may include one or more program modules 42 that generally carry out the functions and/or methodologies of embodiments of the invention as described herein (e.g., such as the functionality provided by DSN memory 96). Specifically, the program modules 42 may store multiple data versions in a DSN memory. Additionally, the program modules 42 may reduce the amount of storage used to store multiple versions of a data object in a DSN memory by storing only the difference of each version of the data object from previous versions of the data object and reduce the amount of data read when reading all versions of the data object stored in the DSN by reading a single complete version of the data object and the difference of each version of the data object from previous versions of the data object. Other functionalities of the program modules 42 are described further herein such that the program modules 42 are not limited to the functions described above. Moreover, it is noted that some of the program modules 42 can be implemented within the infrastructure shown in FIGS. 1-3. For example, the program modules 42 may be representative of a DS processing unit program module 420 and a DS storage unit program module 440 as shown in FIG. 4.

Figure 4:
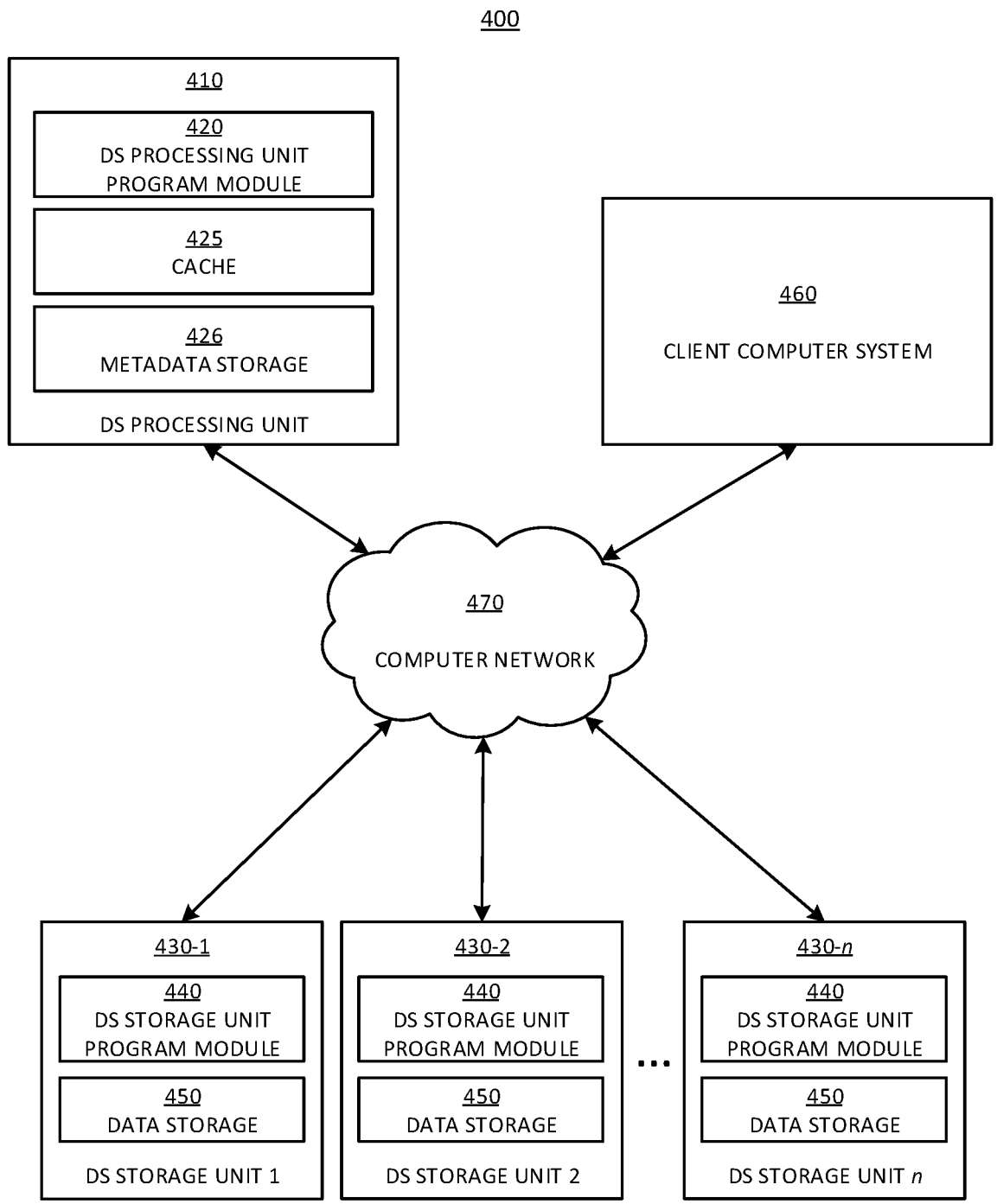
FIG. 4 depicts an illustrative environment in accordance with aspects of the invention.

FIG. 4 depicts an illustrative environment 400 in accordance with aspects of the invention. As shown, the environment 400 comprises a DS processing unit 410, a plurality of DS storage units 430-1, 430-2, . . . , 430-n, and a client computer system 460 which are in communication via a computer network 470. In embodiments, the computer network 470 is any suitable network including any combination of a LAN, WAN, or the Internet. In embodiments, the DS processing unit 410, the plurality of DS storage units 430-1, 430-2, . . . , 430-n, and the client computer system 460 are physically collocated, or, more typically, are situated in separate physical locations.

The quantity of devices and/or networks in the environment 400 is not limited to what is shown in FIG. 4. In practice, the environment 400 may include additional devices and/or networks; fewer devices and/or networks; different devices and/or networks; or differently arranged devices and/or networks than illustrated in FIG. 4. Also, in some implementations, one or more of the devices of the environment 400 may perform one or more functions described as being performed by another one or more of the devices of the environment 400.

In embodiments, the DS processing unit 410 in the environment 400 is situated in the cloud computing environment 50 and is one or more of the nodes 10 shown in FIG. 2. The DS processing unit 410 is implemented as hardware and/or software using components such as mainframes 61; RISC (Reduced Instruction Set Computer) architecture based servers 62; servers 63; blade servers 64; storage devices 65; networks and networking components 66; virtual servers 71; virtual storage 72; virtual networks 73, including virtual private networks; virtual applications and operating systems 74; and virtual clients 75 shown in FIG. 3.

In embodiments, the DS processing unit 410 includes a DS processing unit program module 420 which comprises one or more of the program modules 42 shown in FIG. 1. In embodiments, the DS processing unit program module 420 includes program instructions for storing data objects and retrieving data objects using the plurality of DS storage units 430-1, 430-2, . . . , 430-n, as discussed herein. In embodiments, the DS processing unit 410 also includes a cache 425 and a metadata storage 426, each of which may be implemented using any type of memory (e.g., RAM) or storage device (e.g., hard disk drive, solid state drive, etc.).

Still referring to FIG. 4, in embodiments, each of the plurality of DS storage units 430-1, 430-2, . . . , 430-n in the environment 400 is situated in the cloud computing environment 50 and is one or more of the nodes 10 shown in FIG. 2. Each of the plurality of DS storage units 430-1, 430-2, . . . , 430-n is implemented as hardware and/or software using components such as mainframes 61; RISC (Reduced Instruction Set Computer) architecture based servers 62; servers 63; blade servers 64; storage devices 65; networks and networking components 66; virtual servers 71; virtual storage 72; virtual networks 73, including virtual private networks; virtual applications and operating systems 74; and virtual clients 75 shown in FIG. 3.

In embodiments, each of the plurality of DS storage units 430-1, 430-2, . . . , 430-n includes a DS storage unit program module 440 and a data storage 450. In an example, the DS storage unit program module 440 comprises one or more of the program modules 42 shown in FIG. 1. In embodiments, the DS storage unit program module 440 includes program instructions for storing slices of data objects and retrieving slices of data objects in the data storage 450 in accordance with instructions received from the DS processing unit program module 420 of the DS processing unit 410.

In embodiments, the data storage 450 receives and stores data in accordance with instructions received from the DS storage unit program module 440. The data storage 450 is any type of data storage device or system (e.g., storage device 65 of FIG. 3) and is located on (or is accessible to) the data storage unit 430-1, 430-2, . . . , 430-n. In other embodiments, the data storage 450 is a storage resource provided by a cloud computing provider on another cloud computing node 10 or other location associated with the cloud computing provider that is external to but accessible from the data storage unit 430-1, 430-2, . . . , 430-n.

Still referring to FIG. 4, in embodiments, the client computer system 460 in the environment 400 includes one or more components of the computer system/server 12 (as shown in FIG. 1). In other embodiments, the client computer system 460 in the environment 400 is situated in the cloud computing environment 50 and is one or more of the nodes 10 shown in FIG. 2. In an example, the client computer system 460 is implemented as hardware and/or software using components such as mainframes 61; RISC (Reduced Instruction Set Computer) architecture based servers 62; servers 63; blade servers 64; storage devices 65; networks and networking components 66; virtual servers 71; virtual storage 72; virtual networks 73, including virtual private networks; virtual applications and operating systems 74; and virtual clients 75 shown in FIG. 3. In other embodiments, the client computer system 460 is a desktop computer, a laptop computer, a mobile device such as a cellular phone, tablet, personal digital assistant (PDA), or any other computing device.

Figure 5:
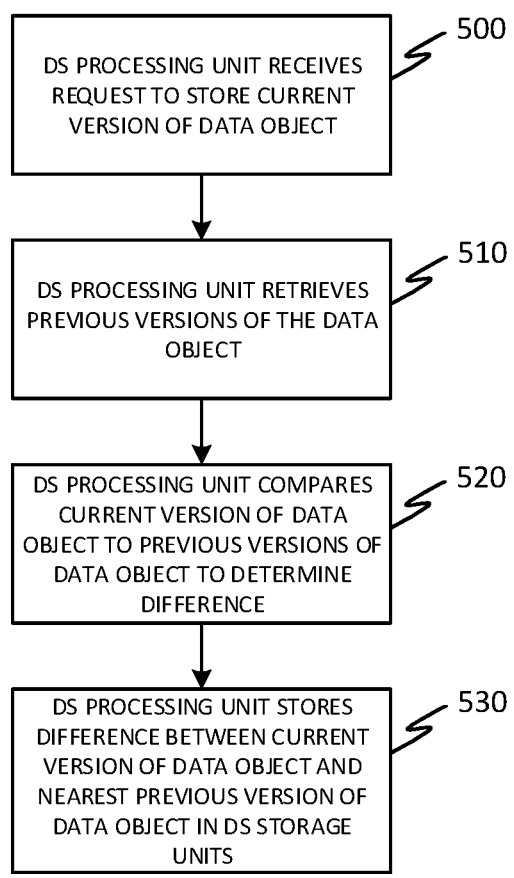
FIGS. 5, 6, 7, and 8 depict flowcharts of exemplary methods performed in accordance with aspects of the invention.

FIG. 5 depicts a flowchart of an exemplary method for reducing the amount of storage used to store multiple versions of a data object in a DSN memory by storing only the difference of each version of the data object from previous versions of the data object. The method of FIG. 5 is performed by the DS processing unit program module 420 of the DS processing unit 410 and the DS storage unit program module 440 of the DS storage units 430-1, 430-2, . . . , 430-n in accordance with aspects of the invention. The steps of the method are performed in the environment of FIG. 4 and are described with reference to the elements shown in FIG. 4.

At step 500, the DS processing unit 410 receives a request to store a current version of a data object. In embodiments, the DS processing unit program module 420 of the DS processing unit 410 receives the request, including the current version of the data object, from the client computer system 460. Optionally, the client computer system 460 includes a hint with the request. In embodiments, the request received from the client computer system 460 includes one or more fields that includes a value for the hint and/or a value that indicates whether or not the hint is included with the request. Additionally, in embodiments, the hint includes information about a particular previous version of the data object that is similar to the current version of the data object.

Still referring to FIG. 5, at step 510, the DS processing unit 410 retrieves previous versions of the data object. In embodiments, the DS processing unit program module 420 of the DS processing unit 410 obtains all of the previous versions of the data object received with the request at step 500, either from the cache 425 (or another cache) or from the DS storage units 430-1, 430-2, . . . , 430-n (e.g., using the method of FIG. 6, as described herein). Optionally, in other embodiments, if a hint specifying a particular previous version of the data object that is similar to the current version of the data object was included in the request received at step 500, then the DS processing unit program module 420 of the DS processing unit 410 obtains only the particular previous version of the data object specified in the hint, either from the cache 425 (or another cache) or from the DS storage units 430-1, 430-2, . . . , 430-n (e.g., using the method of FIG. 6, as described herein).

Still referring to FIG. 5, at step 520, the DS processing unit 410 compares the current version of the data object to previous versions of the data object to determine a difference. In embodiments, for each of the previous versions of the data object retrieved at step 510, the DS processing unit program module 420 of the DS processing unit 410 compares the current version of the data object received with the request at step 500 with the previous version of the data object retrieved at step 510 to determine the difference (delta) between the two versions of the data object, e.g., using a binary diff library function. Optionally, in other embodiments, if a hint specifying a particular previous version of the data object that is similar to the current version of the data object was included in the request received at step 500, then the DS processing unit program module 420 of the DS processing unit 410 only compares the current version of the data object received with the request at step 500 with the particular version of the data object specified in the hint to determine the difference (delta) between the two versions of the data object.

Still referring to FIG. 5, at step 530, the DS processing unit 410 stores the difference between the current version of the data object and a nearest previous version of the data object in the DS storage units 430-1, 430-1, . . . , 430-n. In embodiments, the DS processing unit program module 420 of the DS processing unit 410 determines which of the previous versions of the data object is the nearest previous version of the data object based on a smallest difference (delta) between the current version of the data object and a particular previous version of the data object determined at step 520. In other words, the DS processing unit program module 420 determines that the particular previous version of the data object having the smallest difference (delta) is the nearest previous version of the data object. The DS processing unit program module 420 then stores only the difference (delta) between the current version of the data object and the nearest previous version of the data object in the DS storage units 430-1, 430-2, . . . , 430-n. Optionally, in other embodiments, if a hint specifying a particular previous version of the data object that is similar to the current version of the data object was included in the request received at step 500, then the DS processing unit program module 420 of the DS processing unit 410 determines that the particular previous version of the data object specified in the hint is the nearest previous version of the data object, and the DS processing unit program module 420 then stores only the difference (delta) between the current version of the data object and the particular previous version of the data object specified in the hint in the DS storage units 430-1, 430-2, . . . , 430-n.

Still referring to step 530, the DS processing unit program module 420 stores the difference (delta) between the current version of the data object and the nearest previous version of the data object by dividing a file or binary data that is the difference (delta) into a number of slices corresponding with a number n of DS storage units 430-1, 430-2, . . . , 430-n on which the difference is to be stored. The DS processing unit program module 420 then sends each of the slices to one of the DS storage units 430-1, 430-2, . . . , 430-n for storage. At each of the DS storage units 430-1, 430-2, . . . , 430-n, the DS storage unit program module 440 receives the slice from the DS processing unit 410 and stores the slice in the data storage 450. The DS processing unit program module 420 also stores information about a dependency of the current version of the data object on the nearest previous version of the data object in the metadata storage 426 of the DS processing unit 410.

Figure 6:
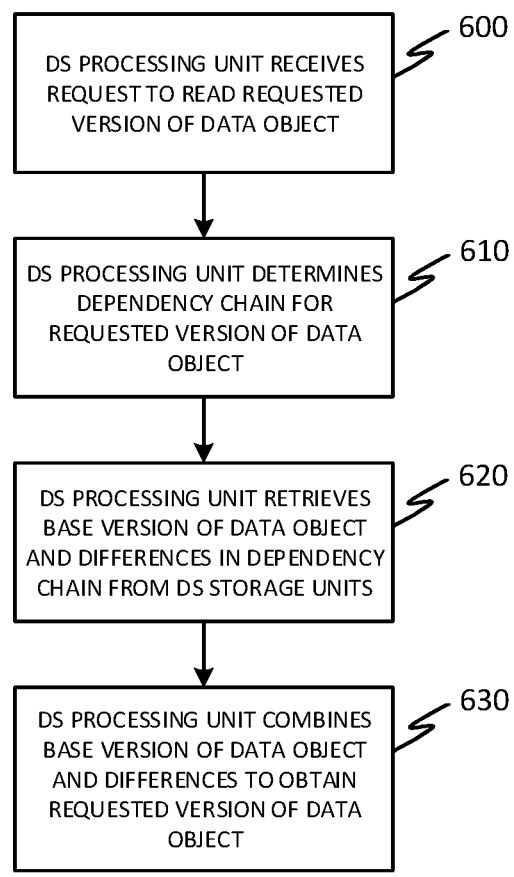

FIG. 6 depicts a flowchart of an exemplary method for reading a version of a data object in a DSN memory stored according to the method of FIG. 5. The method of FIG. 6 is performed by the DS processing unit program module 420 of the DS processing unit 410 and the DS storage unit program module 440 of the DS storage units 430-1, 430-2, . . . , 430-*n* in accordance with aspects of the invention. The steps of the method are performed in the environment of FIG. 4 and are described with reference to the elements shown in FIG. 4.

At step 600, the DS processing unit 410 receives a request to read a requested version of a data object. In embodiments, the DS processing unit program module 420 of the DS processing unit 410 receives the request, including information identifying the requested version of the data object, from the client computer system 460.

Still referring to FIG. 6, at step 610, the DS processing unit 410 determines a dependency chain for the requested version of the data object. In embodiments, the DS processing unit program module 420 of the DS processing unit 410 determines the dependency chain by retrieving metadata from the metadata storage 426 of the DS processing unit 410 that indicates a dependency of the requested version of the data object on a first other version of the data object. This process repeats iteratively, with the DS processing unit program module 420 retrieving metadata from the metadata storage 426 that indicates a dependency of the first other version of the data object on a second other version of the data object, and so on, until the retrieved metadata indicates that a particular version is a base version of the data object (e.g., the particular version of the data object has no dependencies).

Still referring to FIG. 6, at step 620, the DS processing unit 410 retrieves a base version of the data object and differences in the dependency chain from the DS storage units 430-1, 430-2, . . . , 430-*n*. In embodiments, the DS processing unit program module 420 of the DS processing unit 410 uses metadata stored in the metadata storage 426 to determine the DS storage units 430-1, 430-2, . . . , 430-*n* on which slices of the difference for the requested version of the data object (specified in the request received at step 600) and slices of the differences for each of the other versions of the data object in the dependency chain and slices of the base version of the data object (as determined at step 610) are stored. The DS processing unit program module 420 of the DS processing unit 410 then sends requests for the aforementioned slices to the determined DS storage units 430-1, 430-2, . . . , 430-*n*. The requests for the slices are received by the DS storage unit program module 440 of each the DS storage units 430-1, 430-2, . . . , 430-*n*, from the DS processing unit 410. In response to receiving the requests, the DS storage unit program module 440 of each the DS storage units 430-1, 430-2, . . . , 430-*n* retrieves the requested slices from the data storage 450 and sends the retrieved slices to the DS processing unit 410, where they are received by the DS processing unit program module 420.

Still referring to FIG. 6, at step 630, the DS processing unit 410 combines the base version of the data object and the differences to obtain the requested version of the data object. In embodiments, the DS processing unit program module 420 of the DS processing unit 410 combines the slices of the base version of the data object received at step 630 to obtain the base version of the data object. Additionally, for each of the other versions of the data object in the dependency chain, the DS processing unit program module 420 of the DS processing unit 410 combines the slices of the difference for the other version of the data object to obtain the difference for the other version of the data object. Additionally, for the requested version of the data object, the DS processing unit program module 420 of the DS processing unit 410 combines the slices of the difference for the requested version of the data object to obtain the difference for the requested version of the data object.

Still referring to step 630, the DS processing unit 410 then sequentially applies the differences for each of the other versions of the data object in the dependency chain and the difference for the requested version of the data object to the base version of the data object to obtain the requested version of the data object, which the DS processing unit program module 420 then sends to the client computer system 460 as a response to the request received at step 600. In an example, v9 is the requested version of the data object, and v9 has a dependency on v7, v7 has a dependency on v6, and v6 has a dependency on v1 (the base version of the data object). In this example, the DS processing unit program module 420 applies the difference for v6 of the data object to v1 of the data object (the base version of the data object) to obtain v6 of the data object. The DS processing unit program module 420 then applies the difference for v7 of the data object to v6 of the data object to obtain v7 of the data object. Finally, the DS processing unit 410 applies the difference for v9 of the data object to v7 of the data object to obtain v9 of the data object.

Figure 7:
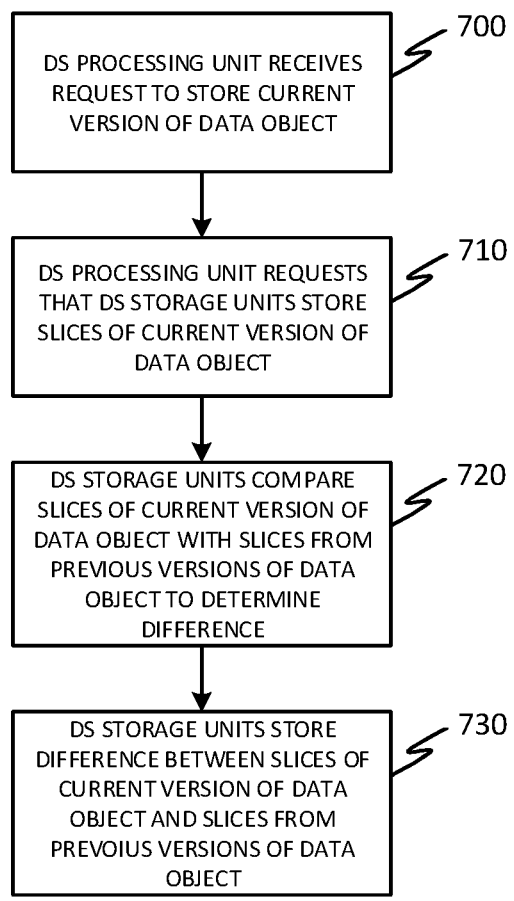

FIG. 7 depicts a flowchart of an exemplary method for reducing the amount of storage used to store multiple versions of a data object in a DSN memory by storing only the difference of each version of the data object from previous versions of the data object according to another embodiment. The method of FIG. 7 is performed by the DS processing unit program module 420 of the DS processing unit 410 and the DS storage unit program module 440 of the DS storage units 430-1, 430-2, . . . , 430-*n* in accordance with aspects of the invention. The steps of the method are performed in the environment of FIG. 4 and are described with reference to the elements shown in FIG. 4.

At step 700, the DS processing unit 410 receives a request to store a current version of a data object. In embodiments, the DS processing unit program module 420 of the DS processing unit 410 receives the request, including the current version of the data object, from the client computer system 460.

Still referring to FIG. 7, at step 710, the DS processing unit 410 requests that the DS storage units 430-1, 430-1, . . . , 430-*n* store slices of the current version of the data object. In embodiments, the DS processing unit program module 420 of the DS processing unit 410 divides the current version of the data object received at step 700 into a number of slices corresponding with a number n of DS storage units 430-1, 430-2, . . . , 430-*n* on which the current version of the data object is to be stored. The DS processing unit program module 420 then sends each of the slices to one of the DS storage units 430-1, 430-2, . . . , 430-*n* for storage. The DS processing unit program module 420 also stores information about the current version of the data object and the storage location of the slices of the data object (e.g., the DS storage units 430-1, 430-2, . . . , 430-*n*) in the metadata storage 426 of the DS processing unit 410.

Still referring to FIG. 7, at step 720, the DS storage units 430-1, 430-2, . . . , 430-*n* compare the slices of the current version of the data object with slices from previous versions of the data object to determine a difference. In embodiments, at each of the DS storage units 430-1, 430-2, . . . , 430-*n*, the DS storage unit program module 440 receives the slice of the current version of the data object sent from the DS processing unit 410 at step 710 (i.e., a current version of the slice) and obtains all of the previous versions of the slice from the data storage 450. Next, at each of the DS storage units 430-1, 430-2, . . . , 430-*n*, for each of the previous versions of the slice, the DS storage unit program module 440 compares the current version of the slice with the previous version of the slice to determine the difference (delta) between the two versions of the data slice, e.g., using a binary diff library function.

Still referring to FIG. 7, at step 730, the DS storage units 430-1, 430-2, . . . , 430-*n* store the difference between the slices of the current version of the data object and the slices from previous versions of the data object. In embodiments, at each of the DS storage units 430-1, 430-2, . . . , 430-*n*, the DS storage unit program module 440 determines which of the previous versions of the slice obtained at step 720 is the nearest previous version of the slice based on a smallest difference (delta) between the current version of the slice and a particular previous version of the slice determined at step 720. In other words, the DS storage unit program module 440 determines that the particular previous version of the slice having the smallest difference (delta) is the nearest previous version of the slice. The DS storage unit program module 440 then stores only the difference (delta) between the current version of the slice and the nearest previous version of the slice in the data storage 450. The DS storage unit program module 440 also stores information about a dependency of the current version of the slice on the nearest previous version of the slice in data storage 450.

Figure 8:
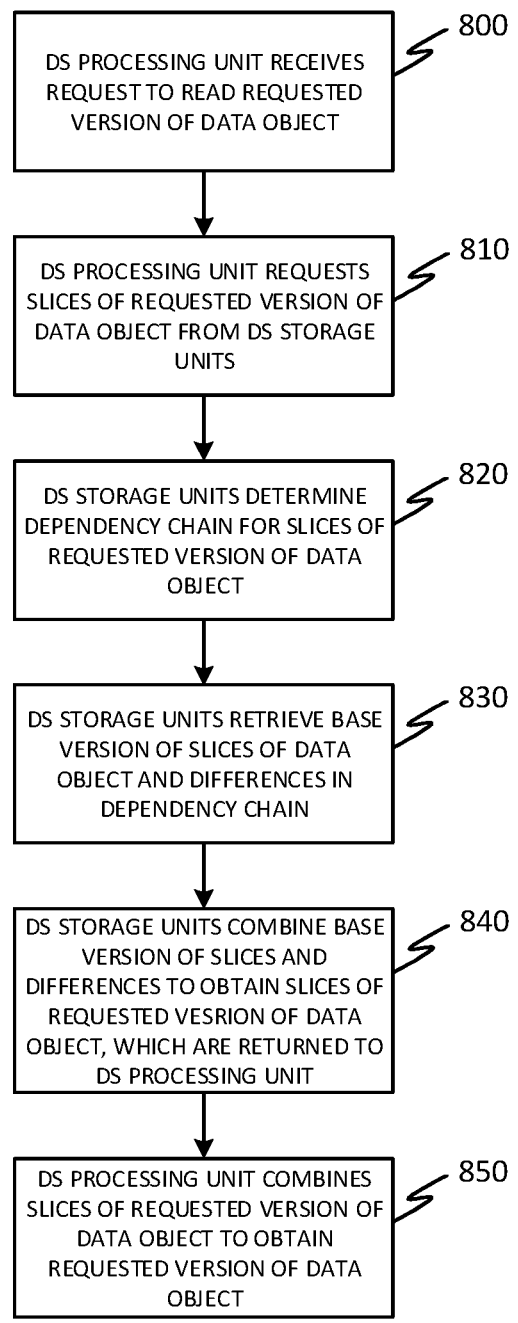

FIG. 8 depicts a flowchart of an exemplary method for reading a version of a data object in a DSN memory stored according to the method of FIG. 7. The method of FIG. 8 is performed by the DS processing unit program module 420 of the DS processing unit 410 and the DS storage unit program module 440 of the DS storage units 430-1, 430-2, . . . , 430-*n* in accordance with aspects of the invention. The steps of the method are performed in the environment of FIG. 4 and are described with reference to the elements shown in FIG. 4.

At step 800, the DS processing unit 410 receives a request to read a requested version of a data object. In embodiments, the DS processing unit program module 420 of the DS processing unit 410 receives the request, including information identifying the requested version of the data object, from the client computer system 460.

Still referring to FIG. 8, at step 810, the DS processing unit 410 requests slices of the requested version of the data object from the DS storage units 430-1, 430-2, . . . , 430-*n*. In embodiments, the DS processing unit program module 420 of the DS processing unit 410 determines the storage location of the slices of the data object (e.g., the DS storage units 430-1, 430-2, . . . , 430-*n*) using metadata stored in the metadata storage 426 of the DS processing unit 410 and sends requests for the slices of the requested version of the data object (from step 800) to the DS storage units 430-1, 430-2, . . . , 430-*n*. The requests for the slices of the requested version are received by the DS storage unit program module 440 of each the DS storage units 430-1, 430-2, . . . , 430-*n*, from the DS processing unit 410.

Still referring to FIG. 8, at step 820, the DS storage units 430-1, 430-2, . . . , 430-*n* determine a dependency chain for the slices of the requested version of the data object. In embodiments, in response to receiving the request for the slices at step 810, the DS storage unit program module 440 of the DS storage units 430-1, 430-2, . . . , 430-*n* determines the dependency chain by retrieving metadata from the data storage 450 of the DS storage units 430-1, 430-2, . . . , 430-*n* that indicates a dependency of the slices of the requested version of the data object (i.e., a requested version of the slice) on slices of a first other version of the data object (i.e. a first other version of the slice). This process repeats iteratively, with the DS storage unit program module 440 retrieving metadata from the data storage 450 that indicates a dependency of slices of the first other version of the data object on slices of a second other version of the data object (i.e., a second other version of the slice), and so on, until the retrieved metadata indicates that a particular version of a slice of the data object is a base version of the slice of the data object (e.g., the particular version of the slice of the data object has no dependencies).

Still referring to FIG. 8, at step 830, the DS storage units 430-1, 430-2, . . . , 430-*n* retrieve a base version of the slices of the data object and differences in the dependency chain. In embodiments, the DS storage unit program module 440 of the DS storage units 430-1, 430-2, . . . , 430-*n* retrieves the base version of the slices of the data object, the differences in the dependency chain determined at step 820, and the differences of the requested version of the slice from the data storage 450.

Still referring to FIG. 8, at step 840, the DS storage units 430-1, 430-2, . . . , 430-*n* combine the base version of the slices and the differences to obtain slices of the requested version of the data object, which are returned to the DS processing unit 410. In embodiments, the DS storage unit program module 440 of the DS storage units 430-1, 430-2, . . . , 430-*n* combines the base version of the slices with the differences to obtain slices of the requested version of the data object. In particular, the DS storage unit program module 440 sequentially applies the differences for each of the other versions of the slice of the data object in the dependency chain and the difference for the requested version of the slice of the data object to the base version of the slice of the data object to obtain the requested version of the slice of the data object, which is then returned to the DS processing unit 410.

In an example, v9 is the requested version of the slice of the data object, and v9 has a dependency on v7, v7 has a dependency on v6, and v6 has a dependency on v1 (the base version of the data object). In this example, the DS storage unit program module 440 applies the difference for v6 of the slice of the data object to v1 of the slice of the data object (the base version of the slice of the data object) to obtain v6 of the slice of the data object. The DS storage unit program module 440 then applies the difference for v7 of the slice of the data object to v6 of the slice of the data object to obtain v7 of the slice of the data object. Finally, the DS storage unit program module 440 applies the difference for v9 of the slice of the data object to v7 of the slice of the data object to obtain v9 of the slice of the data object.

Still referring to FIG. 8, at step 850, the DS processing unit 410 combines the slices of the requested version of the data object to obtain the requested version of the data object. In embodiments, the DS processing unit program module 420 of the DS processing unit 410 combines the slices of the requested version of the data object received at step 840 to obtain the requested version of the data object, which the DS processing unit program module 420 then sends to the client computer system 460 as a response to the request received at step 800.

In embodiments, the metadata for each data object can be used to record information related to the storage format of versions, such as whether a version is a difference, the version from which the difference was calculated, etc. A particular version of a data object or a slice of a data object can also be marked as deleted in the metadata itself, thus preventing future reads, though the data may still remain in storage (on disk) for the purpose of serving as a base for a difference for a different version.

In other embodiments, the feature of storing differences can be applied on an object or slice basis, either by configuration, hints from the client (e.g., the client computer system 460), or based on one or more pieces of information available to the DS processing unit 410 or the DS storage units 430-1, 430-2, . . . , 430-n, such as a size of the difference between versions, the fill level of the system and the need to minimize new storage utilization, the cost of having to read multiple pieces of data (such as a base version and one or more differences) to reconstruct a full version, available CPU and memory to do the comparison and differences, and other factors.

In other embodiments, a system and method are provided for writing multiple data versions of an object in a DSN memory, the method comprising the steps of: receiving a new version of an existing data object; computing, at a DS processing unit, the differences between the existing data object and the new version of the existing data object, or, the differences between new data slices and existing data slices stored in the DSN memory; and storing only the computed differences between the new and existing data objects/slices in the DSN memory.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving, by a computing device, a request to store a current version of a data object in a dispersed storage network (DSN) memory;
   retrieving, by the computing device, a plurality of other versions of the data object from the DSN memory;
   for each of the plurality of other versions of the data object, the computing device determining a difference between the current version of the data object and the other version of the data object; and
   storing, by the computing device, in the DSN memory, the difference between the current version of the data object and a first other version of the data object selected from the plurality of other versions of the data object, wherein the storing is based on pieces of information, wherein the pieces of information include a size of a difference between versions of the data object, a need to minimize new storage utilization, and a cost of having to read multiple pieces of data including a base version of the data object.

2. The method according to claim 1, wherein the computing device is a dispersed storage (DS) processing unit, and the plurality of other versions of the data object are retrieved from a cache of the dispersed storage (DS) processing unit.

3. The method according to claim 1, wherein the computing device is a dispersed storage (DS) processing unit, and the retrieving the plurality of other versions of the data object comprises sending, to a plurality of DS storage units, a request for slices of each of the plurality of other versions of the data object.

4. The method according to claim 1, wherein the difference between the current version of the data object and the other version of the data object is a delta that is determined using a binary diff library function.

5. The method according to claim 1, wherein the first other version of the data object is a nearest previous version of the data object, and wherein the nearest previous version of the data object is a smallest difference between the current version of the data object and each of the plurality of other versions of the data object.

6. The method according to claim 1, further comprising storing, by the computing device, metadata indicating a dependency of the current version of the data object on the first other version of the data object.

7. The method according to claim 1, further comprising combining slices of the base version of the data object to obtain the base version of the data object.

8. A system comprising:
   a hardware processor, a computer readable memory, and a computer readable storage medium associated with a computing device, wherein the computing device is a dispersed storage (DS) storage unit; and
   program instructions stored on the computer readable storage medium for execution by the hardware processor via the computer readable memory, the program instructions executable to:
   receive a request to store a slice of a current version of a data object;
   determine a nearest previous version of the slice by comparing the slice of the current version of the data object to a plurality of previous versions of the slice, wherein the nearest previous version of the data object is a smallest difference between the current version of the data object and each of the plurality of other versions of the data object;

determine a difference between the slice of the current version of the data object and the nearest previous version of the slice; and store the difference in the DS storage unit, wherein the storing is based on pieces of information, wherein the pieces of information include a size of a difference between versions of the data object, a need to minimize new storage utilization, and a cost of having to read multiple pieces of data including a base version of the data object.

9. The system according to claim 8, wherein the request is received from a DS processing unit.

10. The system according to claim 8, wherein the difference between the slice of the current version of the data object and the nearest previous version of the slice is a delta that is determined using a binary diff library function.

11. The system according to claim 8, wherein the program instructions are executable to store metadata indicating a dependency of the slice of the current version of the data object on the nearest previous version of the slice.

12. The system according to claim 8, wherein the program instructions are executable to, in response to receiving a request to delete the nearest previous version of the slice, update metadata of the nearest previous version of the slice to indicate deletion.

13. The system according to claim 12, wherein the program instructions are executable to, in response to receiving the request to delete the nearest previous version of the slice, maintain the nearest previous version of the slice in storage.

* * * * *